US009911409B2

(12) United States Patent
Hong

(10) Patent No.: US 9,911,409 B2
(45) Date of Patent: Mar. 6, 2018

(54) SPEECH RECOGNITION APPARATUS AND METHOD

(71) Applicant: Samsung Electronics Co., Ltd., Suwon-si (KR)

(72) Inventor: Seokjin Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/216,121

(22) Filed: Jul. 21, 2016

(65) Prior Publication Data

US 2017/0025117 A1 Jan. 26, 2017

(30) Foreign Application Priority Data

Jul. 23, 2015 (KR) ........................ 10-2015-0104554

(51) Int. Cl.
| | | |
|---|---|---|
| *G10L 15/00* | (2013.01) | |
| *G10L 15/06* | (2013.01) | |
| *G10L 15/19* | (2013.01) | |
| *G10L 15/16* | (2006.01) | |
| *G10L 15/02* | (2006.01) | |
| *G10L 15/187* | (2013.01) | |

(52) U.S. Cl.
CPC ............ *G10L 15/063* (2013.01); *G10L 15/19* (2013.01); *G10L 15/16* (2013.01); *G10L 15/187* (2013.01); *G10L 2015/027* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 5,797,122 A | * | 8/1998 | Spies .................... | G10L 15/197 704/252 |
| 5,799,274 A | * | 8/1998 | Kuroda ............... | G10L 15/1807 704/239 |
| 6,385,579 B1 | * | 5/2002 | Padmanabhan ....... | G10L 15/063 704/243 |
| 6,393,399 B1 | * | 5/2002 | Even ..................... | G10L 15/193 704/235 |
| 8,140,332 B2 | * | 3/2012 | Itoh ..................... | G06F 17/2735 704/10 |
| 8,356,032 B2 | | 1/2013 | Kim et al. | |
| 9,135,231 B1 | * | 9/2015 | Barra ...................... | G06F 17/24 |
| 2004/0054539 A1 | * | 3/2004 | Simpson ................ | G10L 15/30 704/270.1 |
| 2007/0094024 A1 | * | 4/2007 | Kristensson .......... | G06F 3/0237 704/252 |
| 2010/0185438 A1 | * | 7/2010 | De La Cruz ........ | G06F 17/2735 704/10 |

(Continued)

FOREIGN PATENT DOCUMENTS

| | | |
|---|---|---|
| JP | 2010-197644 A | 9/2010 |
| JP | 2014-92571 A | 5/2014 |

(Continued)

*Primary Examiner* — Jesse Pullias
(74) *Attorney, Agent, or Firm* — NSIP Law

(57) ABSTRACT

A speech recognition apparatus includes a processor configured to recognize a user's speech using any one or combination of two or more of an acoustic model, a pronunciation dictionary including primitive words, and a language model including primitive words; and correct word spacing in a result of speech recognition based on a word-spacing model.

36 Claims, 11 Drawing Sheets

The boy s plant ed these tree s

410

⇩ CORRECT WORD SPACING

The boys planted these trees

420

(56) References Cited

U.S. PATENT DOCUMENTS

2014/0350933 A1   11/2014   Bak et al.

FOREIGN PATENT DOCUMENTS

| JP | 2014-92751 A | 5/2014 |
| KR | 10-2005-0001684 A | 1/2005 |
| KR | 10-2007-0087399 A | 8/2007 |
| KR | 10-2014-0077788 A | 6/2014 |
| KR | 10-2014-0138011 A | 12/2014 |

* cited by examiner

FIG. 4

410 ↗ The boy s plant ed these tree s

⇩ CORRECT WORD SPACING

420 ↗ The boys planted these trees

SPEECH RECOGNITION APPARATUS AND METHOD

CROSS-REFERENCE TO RELATED APPLICATION(S)

This application claims the benefit of Korean Patent Application No. 10-2015-0104554, filed on Jul. 23, 2015, in the Korean Intellectual Property Office, the entire disclosure of which is incorporated herein by reference for all purposes.

BACKGROUND

1. Field

The following description relates to a speech recognition apparatus and method.

2. Description of Related Art

Generally, in automated speech recognition, words are recognized as a sequence of phonemes defined in a pronunciation dictionary. Thus, in such a speech recognition technology, a speech recognition result is represented by a sequence of phonemes, e.g. as basic linguistic units, present in the pronunciation dictionary, and hence, if a word is not defined in the pronunciation dictionary, it is regarded as being out of vocabulary (OOV) and cannot be recognized by the speech recognition device.

If the number of words in the pronunciation dictionary is merely indefinitely increased in an attempt to address the above problem, the speech recognition efficiency of the speech recognition device becomes reduced as the amount of resource use increases dramatically. For these reasons, the number of words in the dictionary is generally limited to up to a million words.

However, in such speech recognition device, when the number of words in the pronunciation dictionary is restricted, words that are not defined in the pronunciation dictionary cannot be recognized. Thus, there are technological problems associated with such speech recognition devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a speech recognition apparatus includes a processor configured to recognize a user's speech using any one or any combination of any two or more of an acoustic model, a pronunciation dictionary including primitive words, and a language model including primitive words; and correct word spacing in a result of speech recognition based on a word-spacing model.

Either one or both of the pronunciation dictionary and the language model may be configured to include the primitive words according to any one or any combination of any two or more of the following criteria: words whose frequency of use is determined to be greater than a specific threshold; morpheme-level words; and syllable-level words.

The speech recognizer may include a feature extractor configured to extract a feature vector from an input speech signal, and a decoder configured to detect a primitive word string of a substantially highest probability from the extracted feature vector based any one or any combination of any two or more of the acoustic model, the pronunciation model, and the language model.

The language model including the primitive words may be trained using a corpus reconstructed to include the primitive words.

The word-spacing model may be trained using a corpus.

According to another general aspect, a speech recognition method includes performing speech recognition using any one or any combination of two or more of an acoustic model, pronunciation dictionary including primitive words, and a language model including the primitive words; and correcting word spacing in a result of speech recognition using a word-spacing model.

Either one or both of the pronunciation dictionary and the language model may be generated to comprise the primitive words based on any one or any combination of two or more of the following criteria: words whose frequency of use is determined to be greater that a specific threshold; morpheme-level words; and syllable-level words.

The speech recognition may include extracting a feature vector from an input speech signal, and detecting a primitive word string of a substantially highest probability from any one or any combination of two or more of the extracted feature vector based on the acoustic model, the pronunciation model, and the language model.

The language model may be generated to include only the primitive words, trained using a corpus reconstructed to include only the primitive words.

The word-spacing model may be trained using a corpus.

According to another general aspect, a speech recognition apparatus includes a processor configured to: generate a pronunciation dictionary that includes primitive words; generate a language model that is trained using a corpus which is reconstructed to include primitive words; and generate a word-spacing model that is trained using a collected corpus.

The pronunciation dictionary generator may include a word collector configured to collect words; a word deconstructor configured to deconstruct words that are not primitive words among the collected words into primitive words; and a dictionary generator configured to build the pronunciation dictionary that includes essentially only the primitive words based on a result of word deconstruction.

The language model generator may include a corpus collector configured to collect the corpus; a corpus reconstructor configured to reconstruct the corpus by deconstructing words in the corpus into primitive words; and a language model trainer configured to generate the language model that is trained on the reconstructed corpus and includes the primitive words.

The corpus reconstructor may be configured to reconstruct the corpus to space the primitive words apart from each other.

The word-spacing model generator may include a corpus collector configured to collect a corpus and a word-spacing model trainer configured to train the word-spacing model by defining each syllable of a respective sentence in the collected corpus as input data and defining information about whether the syllable is spaced apart from a following syllable as target data.

The word-spacing model trainer may use any one or any combination of any two or more of a recurrent neural network (RNN), long short term memory (LSTM), a decision tree, a genetic algorithm (GA), genetic programming (GP), Gaussian process regression, linear discriminant analysis, K-nearest neighbor (K-NN), the percept theory, a radial basis function network, and a support vector machine.

The speech recognition apparatus may further include a memory configured to store instructions; wherein the processor may be further configured to execute the instructions to configure the processor to recognize the user's speech using any one or any combination of two or more of the acoustic model, the pronunciation dictionary comprising primitive words, and the language model comprising the primitive words stored in the memory; and correct word spacing in the result of speech recognition based on the word spacing model.

The processor may include a speech recognizer configured to recognize the user's speech using any one or any combination of two or more of the acoustic model, the pronunciation dictionary including primitive words, and the language model including primitive words stored in a memory; and, a word-spacing corrector configured to correct word spacing in the result of speech recognition based on the word-spacing model.

The processor may be further configured to recognize the user's speech using the acoustic model, the pronunciation dictionary, and the language model.

The pronunciation dictionary and the language model may consist essentially of primitive words.

The pronunciation dictionary and the language model may consist solely of primitive words.

The decoder may be further configured to detect the primitive word string of the highest probability from the extracted feature vector based on the acoustic model, the pronunciation model, and the language model.

The corpus may be reconstructed to consist essentially of the primitive words.

The corpus may be reconstructed to consist solely of the primitive words.

A non-transitory computer-readable storage medium may store instructions that, when executed by a processor, cause the processor to perform the method.

The performing speech recognition may use the acoustic model, the pronunciation dictionary, and the language model.

The pronunciation dictionary and language model may be generated to consist essentially of the primitive words.

The pronunciation dictionary and language model may be generated to consist solely of the primitive words.

The speech recognition apparatus may further include a memory configured to store instructions; wherein the processor may be further configured to: execute the instructions to configure the processor to generate a pronunciation dictionary that includes primitive words; generate a language model that is trained using a corpus which is reconstructed to include primitive words; and generate a word-spacing model that is trained using a collected corpus.

The processor may include a pronunciation dictionary generator configured to generate a pronunciation dictionary that includes primitive words; a language model generator configured to generate a language model that is trained using a corpus which is reconstructed to include primitive words; and a word-spacing model generator configured to generate a word-spacing model that is trained using a collected corpus.

According to another general aspect, a speech recognition method, includes generating a pronunciation dictionary formed of primitive word portions; recognizing speech of a user based on an acoustic model corresponding with the pronunciation dictionary formed of primitive words.

The method may further include transforming a natural language corpus into a primitive word corpus formed of primitive word portions; and, generating a language model based on the transformed corpus.

The recognizing the speech may be further based on the language model based on the transformed corpus.

The method may further include generating a word-spacing model; and, correcting word spacing in a result of speech recognition using the word-spacing model.

The method may further include transmitting a message including the corrected result of speech recognition.

The method may further include executing a command in response to a result of speech recognition.

Other features and aspects will be apparent from the following detailed description, the drawings, and the claims.

BRIEF DESCRIPTION OF THE DRAWINGS

FIG. 4 is a diagram illustrating an example of word spacing correction, according to an embodiment.

Throughout the drawings and the detailed description, the same reference numerals may refer to the same or like elements. The drawings may not be to scale, and the relative size, proportions, and depiction of elements in the drawings may be exaggerated for clarity, illustration, and convenience.

DETAILED DESCRIPTION

Figure 1:
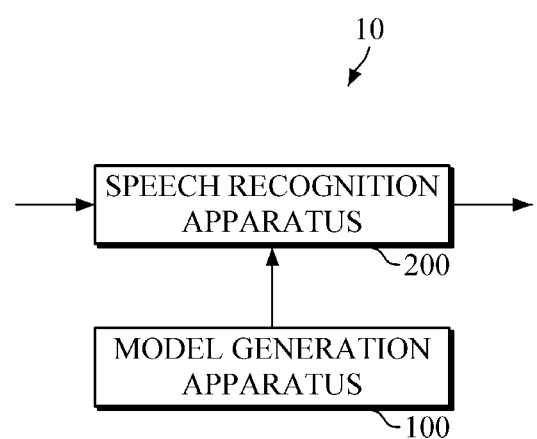
FIG. 1 is a diagram illustrating an example of a speech recognition system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The term "word" used in the following description may be defined as a sequence of syllables grouped together to form one language or linguistic unit that is spaced separately from other language or linguistic units when speech is recognized or grammatically organized. So for example, the sentence "I'm a student" is deemed as being 3 words: "I'm", "a", and "student". The term "word" may be used differently from the term "primitive word" or "primitive word portion" (which may be used interchangeably).

For example, the term "primitive word" in the following description is defined as a language unit of speech recognition, which may be determined or set in advance by a user according to various criteria. The primitive word may be used to deconstruct a non-primitive word into primitive words.

Words whose frequency of use is determined to be greater than a specific threshold may also be determined as primitive words. For example, under the assumption that words "foot" and "ball" have the frequency of use greater than a specific threshold and word "football" has the frequency of use lower than the threshold, "foot" and "ball" are determined as the primitive words, but "football" is not.

In addition, primitive words may also be morpheme language or linguistic units, as morpheme-level words. In the case of a word "mistreatment" which consists of morphemes "mis", "treat", and "ment," the morphemes, "mis", "treat", and "ment", are regarded as the primitive words, but the word "mistreatment" itself is not considered to be a primitive word (in this example, presuming that it does not meet the e.g. frequency of use or other criteria which may be selectively employed to define the primitive words for inclusion into the language.

Furthermore, primitive words may also be syllable language or linguistic units, as syllable-level words. In the case of a word "watches" consisting of syllables "watch" and "es", the syllables "watch" and "es" are determined as primitive words, but the word "watches" is not counted as a primitive word.

FIG. 1 is a diagram illustrating an example of a speech recognition system according to an embodiment.

Referring to FIG. 1, the speech recognition system 10 includes a model generation apparatus 100 and a speech recognition apparatus 200 for example.

The model generation apparatus 100 may, for example, generate an acoustic model, a pronunciation dictionary that is composed of only the primitive words, a language model that is also composed of only the primitive words, and a word-spacing model, which may be used by the speech recognition apparatus 200. According to one or more other embodiments, the pronunciation dictionary and language model may include other than strictly primitive words and/or there may be further, non-primitive dictionaries available for use during speech recognition.

The model generation apparatus 100 may, according to an embodiment, construct a robust acoustic model by training the model on a variety of pronunciations by multiple speakers.

The acoustic model is used in recognition of user's speech. Generally, the acoustic model used in speech recognition is based on a hidden Markov model (HMM). The respective language or linguistic units recognized by the acoustic model for speech recognition may include a phoneme, a diphone, a triphone, a quinphone, a syllable, a word, etc.

According to one or more embodiments, the model generation apparatus 100 may deconstruct a respective word collected from a dictionary or corpus into a sequence of primitive words, and generate a pronunciation dictionary that is composed of solely the primitive words. In other configurations, the pronunciation dictionary may also contain other words which may not be primitive words. For example, a weighting variable or flag may allow the presence of the non-primitive words, but may signal not to use certain words, or may signal a low weight or correspondingly low processing time to be given to such words. Other suitable mechanisms to include non-primitive words, but avoid processing and memory overhead may be apparent to one of skill in the art, after gaining a thorough understanding of the detailed disclosure.

The pronunciation dictionary models the pronunciations of primitive words, each of which forms the language unit of speech recognition. That is, the pronunciation dictionary is used to determine a primitive word that matches with a specific sequence of phonemes.

In an example, the model generation apparatus 100 may generate a language model that consists of or recognizes only the primitive words by training the language model on a corpus that is reconstructed based on the primitive words. According to one or more other embodiments, the trained language model and reconstructed corpus may still contain some non-primitive words. For example, a flag or weighting value may be employed to retain non-primitive words, but reduce the likelihood or remove the non-primitive words from consideration.

The language model defines the rules of the language to be recognized that specify relations between primitive words, to predefine an expected grammar. The language model may be mostly used in continuous speech recognition, e.g., based on networks, relationships, or connectivity between primitive words. The language model may also selectively implement such a primitive only modeling while also being trained to recognize non-primitive words. Because the speech recognition apparatus, according to one or more embodiments, uses the language model for detection, the search space of detection is reduced, the processing of the computer itself is substantially improved, the real world results of infinitely-variable analog recognized human speech is furthered, power and energy are saved, reduced waste heat is generated, and because the language model contributes to significantly increasing the probability of grammatically correct sentences, the recognition rate is also improved. For example, according to the specified grammar relations between primitive words, the pronunciation dictionary is substantially reduced in size, and is generated to include more statistically likely primitive words, according to one or more embodiments, based on the already recognized primitive words.

According to an embodiment, the model generation apparatus 100 builds a word-spacing model through model training based on a corpus. A corpus may be a body of text such as a library, an archive of user emails, text messages, social network posts, or other such collection or compilation of substantially accurate written language, for example.

The word-spacing model is used to correct spacing in a speech recognition result from the speech recognition apparatus 200. As described above, according to one or more embodiments, the pronunciation dictionary and the language model are created based on the primitive words that the user has designated. For example, the pronunciation dictionary and the language model are constructed in a form that does not conform to the standard word-spacing rules. Hence, if speech recognition is performed using the pronunciation dictionary and the language model, which both consist, according to one or more non-limiting embodiments, of only primitive words and are generated by the model generation apparatus 100, the result of speech recognition may have errors in word spacing. To correct such errors in word spacing, the word-spacing model is used, according to one or more embodiments, to correct such improper spacing in the speech recognition result. As described above, the primitive word refers to a language or linguistic units of speech recognition which is predetermined or predesignated by the user, an administrator, or automatically according to various criteria, and the primitive words may be words whose frequency of use is determined to be greater than a specified predetermined threshold, morpheme-level words, any or any combination of words, morphemes, or syllables, for example, and thus, the primitive words may be word-level words, or syllable-level words, for example.

A model generation apparatus 100 is described in greater detail below with reference to FIG. 2.

The speech recognition apparatus 200, according to one or more embodiments, performs speech recognition using the acoustic model, the pronunciation dictionary and the language model which include only the primitive words, and the word-spacing model, which may all be generated by the model generation apparatus 100.

The speech recognition apparatus 200 may refer to the acoustic model, pronunciation model, and language model to perform speech recognition, and correct word-spacing of the speech recognition result using the word-spacing model. In one or more embodiments, any of the acoustic model, language model, pronunciation model, and word spacing model may be hardware, such as respective processors, a single processor, or implemented in an assembly of processors. Likewise, the speech recognition apparatus 200, and the model generation apparatus 100 are hardware, such as respective processors or any of the above referred processor configurations.

As an example of the pronunciation dictionary and the language model, where the primitive words are morpheme-level words, a word "mistreatment" has three morphemes "mis", "treat", and "ment", and these three morphemes are counted as primitive words, but the word "mistreatment" itself is not considered as a primitive word. Each of the pronunciation dictionary and the language model, which are generated by the model generation apparatus 100, consists of "mis", "treat", and "ment". Hence, the pronunciation model and the language model may be constructed in the form that does not conform to the standard word-spacing rules. When such morpheme-level dictionary and language model are used, the speech recognition result may be presented as "mis treat ment", in which word spacing is wrong. The speech recognition apparatus 200 corrects the word spacing in the speech recognition result ("mis treat ment") so as to produce a final result ("mistreatment").

A speech recognition apparatus 200 is described below in detail with reference to FIG. 3.

Hereinafter, according to one or more embodiments, explanation of FIG. 2 will be made with that the primitive words being set to be syllable-level words, though, as noted above, embodiments are not limited to the same.

Figure 2:
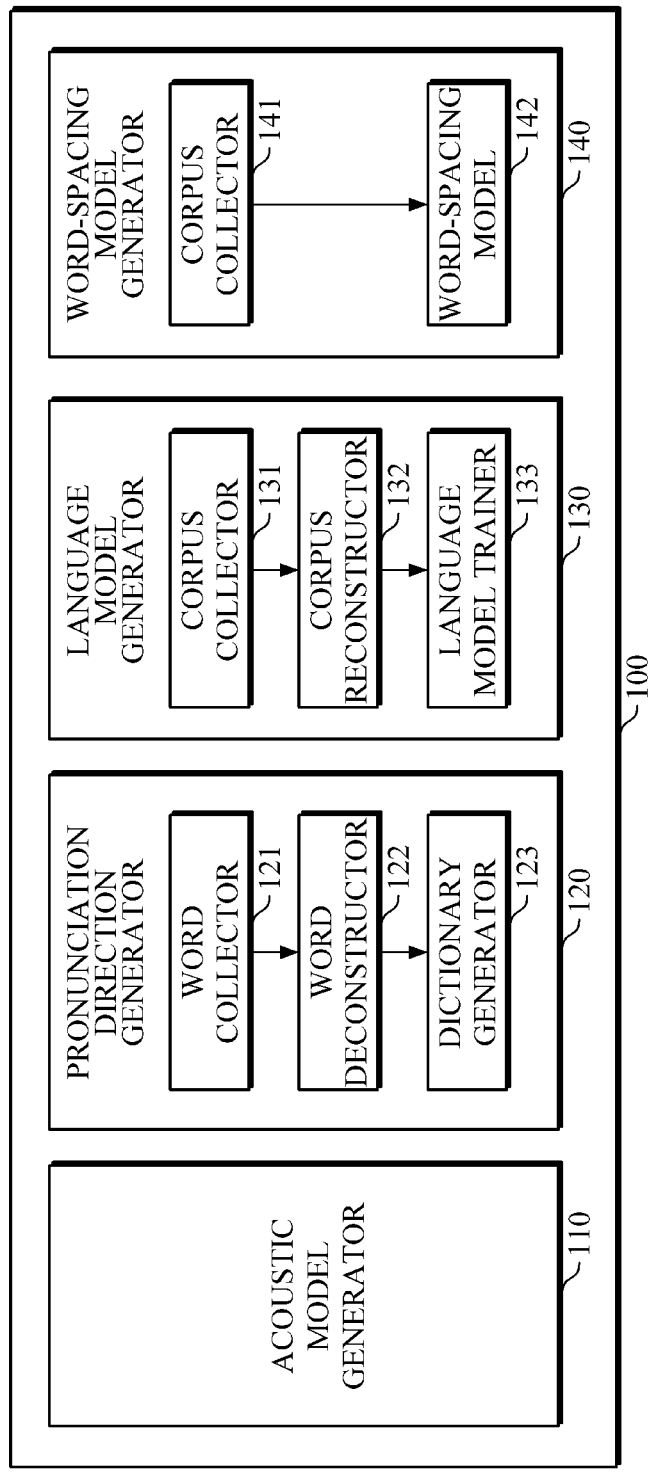
FIG. 2 is a diagram illustrating an example of a model generation apparatus according to an embodiment.

FIG. 2 is a diagram illustrating an example of a model generation apparatus, such as the model generation apparatus 100 of FIG. 1, noting that embodiments are not limited to the same. Thus, as only an example, descriptions of aspects of FIG. 2 will be explained through reference to the model generation apparatus 100 of FIG. 1.

Referring to FIG. 2, the model generation apparatus 100 includes an acoustic model generator 110, a pronunciation direction generator 120, a language model generator 130, and a word-spacing model generator 140, for example.

The acoustic model generator 110 may, according to one or more embodiments, generate an acoustic model based on training on pronunciations by multiple speakers. For example, the acoustic model generator 110 may use hidden Markov model (HMM) as the acoustic model.

The pronunciation dictionary generator 120 may build a pronunciation dictionary that includes only primitive words. To this end, the pronunciation dictionary generator 120 may include a word collector 121, a word deconstructor 122, and a dictionary generator 123.

The word collector 121 may collect words from a corpus or a dictionary. Here, the "word" may be defined as a sequence of syllables grouped together to form one language unit that is spaced separately from other language units. For example, the sentence "The boys planted these trees" is deemed as being five words: "the", "boys", "planted", "these", and "trees".

The word deconstructor 122 may deconstruct each non-primitive word into primitive words. In the above example where "boys" consists of two morphemes, "boy" and "s", "planted" consists of two morphemes, "plant" and "ed", and "trees" also consists of two morphemes, "tree" and "s", the word deconstructor 122 may deconstruct "boys" into "boy" and "s"; "planted" into "plant" and "ed"; and "trees" into "tree" and "s".

Based on the word deconstruction results, the dictionary generator 120 may, according to one or more embodiments, generate a pronunciation dictionary that includes only primitive words. In the above example, the dictionary generator 120 may build the pronunciation dictionary that includes only the primitive words, "the", "boy", "s", "plant", "ed", "these", and "tree".

The language model generator 130 may generate a language model, for example, that includes solely primitive words. To do so, according to one or more embodiments, the language model generator 130 includes a corpus collector 131, a corpus reconstructor 132, and a language model trainer 133, for example.

The corpus collector 131 may collect a corpus for language model training.

The corpus reconstructor 132 may reconstruct a corpus by deconstructing each word in the corpus into primitive words. According to one or more embodiments, the corpus reconstructor 132 may deconstruct a non-primitive word into primitive words and reconstruct the corpus in which the primitive words are spaced apart from each other.

For example, if the corpus has the sentence "The boys planted these trees", the corpus reconstructor 132 deconstructs "boys" into "boy" and "s", "planted" into "plant" and "ed", and "trees" into "tree" and "s", and then reconstructs a corpus in which the sentence is presented as such: "The boy s plant ed these tree s".

The language model trainer 133 may train a language model on the reconstructed corpus so as to form a language model that includes only primitive words.

The language model trainer 133 may use one or more of a recurrent neural network (RNN), long short term memory (LSTM), a decision tree, a genetic algorithm (GA), genetic programming (GP), Gaussian process regression, linear discriminant analysis, K-nearest neighbor (K-NN), the percept theory, a radial basis function network, and a support vector machine.

The word-spacing model generator 140 may generate a word-spacing model via training based on a corpus. To this end, the word-spacing model generator 140 includes a corpus collector 141 and a word-spacing model trainer 142, for example.

The corpus collector 141 may collect the corpus to train the word-spacing model.

The word-spacing model trainer 142 may train the word-spacing model by defining, as input data, each syllable of a respective sentence in the collected corpus and defining, as target data, information about whether the syllable is spaced apart from the following syllable.

The word-spacing model trainer 142 may also train the word-spacing model on punctuation marks, as well as word spacing.

The word-spacing model trainer 142 may use one or more of a recurrent neural network (RNN), long short term memory (LSTM), a decision tree, a genetic algorithm (GA), genetic programming (GP), Gaussian process regression, linear discriminant analysis, K-nearest neighbor (K-NN), the percept theory, a radial basis function network, and a support vector machine.

Although, the corpus collector 130 and the corpus collector 141 are described as individual elements, they may be integrated into one element, e.g., as one processor or in combination in any of the above mentioned processor implementations, according to one or more embodiments.

Figure 3:
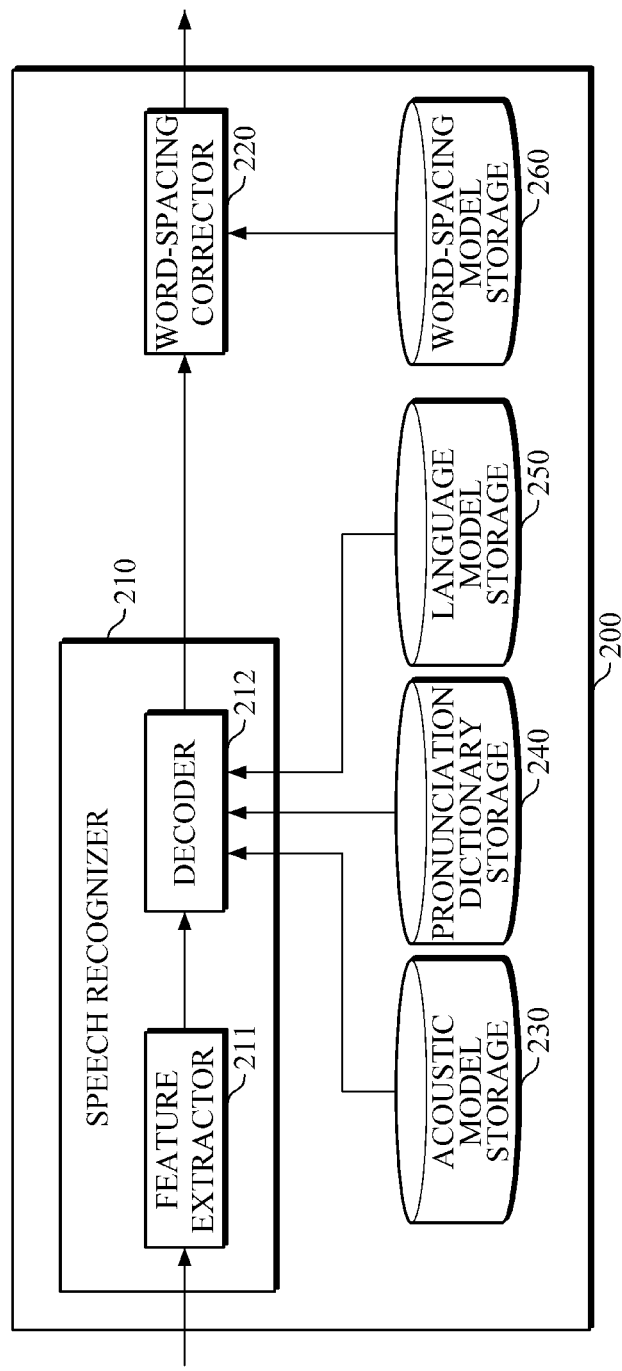
FIG. 3 is a diagram illustrating an example of a speech recognition apparatus according to an embodiment.

FIG. 3 is a diagram illustrating an example of a speech recognition apparatus, such as the speech recognition apparatus 200 of FIG. 1, noting that embodiments are not limited to the same. Thus, as only an example, descriptions of aspects of FIG. 3 will be explained through reference to the speech recognition apparatus 200 of FIG. 1.

Referring to FIG. 3, the speech recognition apparatus 200 includes a speech recognizer 210, a word-spacing corrector 220, an acoustic model storage 230, a pronunciation dictionary storage 240, a language model storage 250, and a word-spacing model storage 260.

The speech recognizer 210 may perform speech recognition using the acoustic model, the pronunciation dictionary and the language model, which may all be generated by the model generation apparatus 100 of FIG. 1 or 2, for example, wherein the pronunciation dictionary and the language model both include only primitive words. To this end, the speech recognizer includes a feature extractor 211 and a decoder 212, for example.

The feature extractor 211 may divide an input speech signal into language or linguistic unit frames of equal length and extract a feature vector from a corresponding language unit frame.

According to one or more embodiments, the feature extractor 211 may detect a speech period from the input speech signal through voice activity detection (VAD), and extract speech features from the detected speech period in order to obtain information suitable for the speech recognition. The feature extractor 211 may calculate frequency characteristics of the speech signal on the language unit frame-by-unit frame basis so as to extract the feature vector from the speech signal. In so doing, the feature extractor 211 may include an analog-to-digital (A/D) converter to convert an analog speech signal into a digital signal, and may perform signal processing by dividing the digitally converted speech signal into language unit frames of, strictly as a non-limiting example, approximately 20 ms long.

In addition, the feature extractor 211 may extract the feature vector using Mel-frequency cepstral coefficients (MFCC) feature extraction. The MFCC feature extraction may use feature vectors that are the combination of Mel-cepstrum coefficients, the log energy, and the first and second order derivatives of said coefficients and log energy.

In addition, the feature extractor 211 may use linear predictive coding (LPC), LPC derived cepstrum, perspective linear prediction (PLP), audio model feature extraction, and filter bank, when extracting the speech signal features from the unit frame.

The decoder 212 may perform Viterbi detection to select the primitive word string of the highest probability from the feature vector that has been extracted by the feature extractor 211 using the acoustic model, and the pronunciation dictionary and language model which both include only the primitive words. In this case, target vocabularies may form a tree topology for large vocabulary recognition, and the decoder 212 may perform detection from the tree.

The word-spacing corrector 220 may use the word-spacing model generated by the model generation apparatus 100 in order to correct the word-spacing in the speech recognition result from the speech recognizer 210.

The word-spacing corrector 220 may perform compromise word spacing correction by combining the word-spacing-model-based correction result and word spacing presented in the speech recognition result from the speech recognizer 210.

The acoustic model storage 230 may store the acoustic model generated by such a model generation apparatus 100 in either of FIG. 1 or 2, for example; the pronunciation dictionary storage 240 may store the pronunciation model generated by such a model generation apparatus 100, for example, with only primitive words; the language model storage 250 may store the language model generated by the model generation apparatus 100 with, for example, only primitive words, and the word-spacing model storage 260 may store the word-spacing model generated by the model generation apparatus 100.

The acoustic model storage 230, the pronunciation dictionary storage 240, the language model storage 250, and the word-spacing model storage 260 may include at least one, or more, of the following types of storage media: flash memory; hard disk; multimedia card micro-type memory; card type memory (e.g., SD or XD memory); a RAM; a ROM, an electrically erasable programmable ROM (EEPROM), programmable read-only memory (PROM), a magnetic memory, a magnetic disk, and an optical disk or representative of a network attached storage (NAS) or cloud-based storage.

FIG. 4 is a diagram illustrating an example of word spacing correction.

As described above, the pronunciation model and the language model which both include only the primitive words do not always conform to the standard word-spacing rules. Thus, speech recognition based on such a dictionary and model results in improper word spacing in an output. To prevent such spacing errors, a word-spacing corrector, such as the word spacing corrector 220 of FIG. 3 may use the word-spacing model, for example, to correct the word spacing in the speech recognition result, and output a final result with the appropriate word spacing.

In the example shown in FIG. 4, the word spacing of the speech recognition result ("The boys planted these trees") 410 from a speech recognizer, such as the speech recognizer 210 of FIG. 3 is corrected so as to form a final recognition result ("The boys planted these trees") 420.

Figure 5:
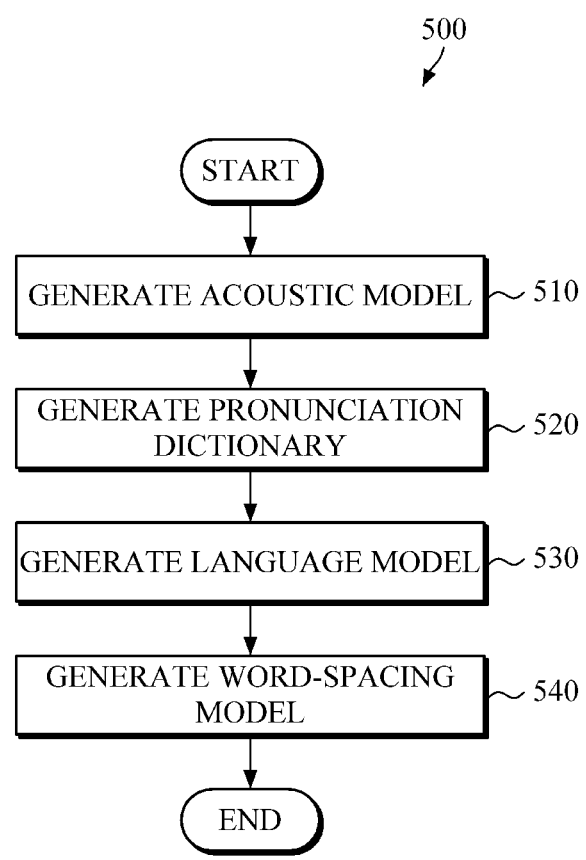
FIG. 5 is a flowchart illustrating a method for generating a model according to an embodiment.

FIG. 5 is a flowchart illustrating a method for generating a model according to an embodiment.

Referring to FIG. 5, the method 500 for generating speech recognition models begins with generating an acoustic model, as depicted in 510). A model generation apparatus, such as any of the model generation apparatus 100 of FIG. 1 or 2, may generate the acoustic model based on, for example, pronunciations by multiple speakers.

Then, a pronunciation dictionary that includes only primitive words is generated, as depicted in 520, and a language model that includes only primitive words is generated, as depicted in 530. While the pronunciation dictionary and language model are described as containing only primitive words, this is merely a non-limiting example which are generated to omit substantially all non-primitive words. However, in one or more embodiments, the pronunciation dictionary and language model may not entirely omit all non-primitive words. Then, in 540, a word-spacing model is generated to be used for correcting word spacing of the speech recognition result, which has been obtained by using said pronunciation dictionary and language model.

Figure 6:
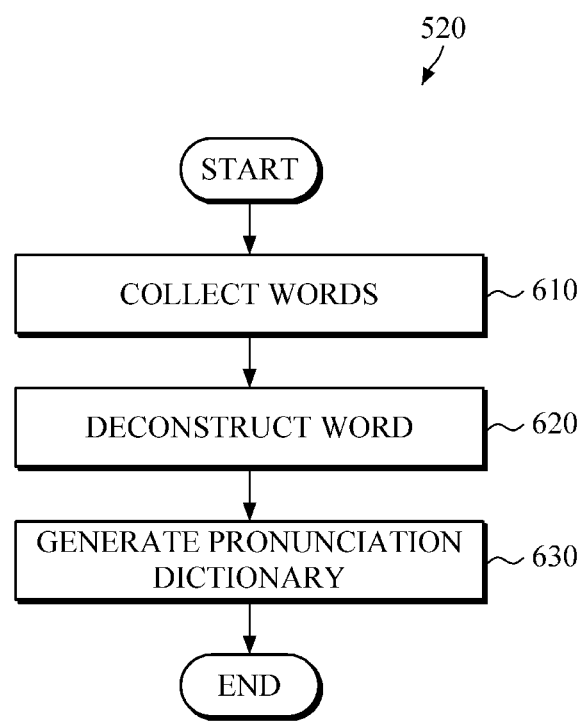
FIG. 6 is a flowchart illustrating an example of a process of generating a pronunciation dictionary according to an embodiment.

FIG. 6 is a flowchart illustrating an example of the process of generating a pronunciation dictionary, such as the generation of the pronunciation dictionary of FIG. 5, noting that embodiments are not limited to the same.

Referring to FIG. 6, to generate the pronunciation dictionary, words are first collected from a corpus or a dictionary, as depicted in 610.

Then, the words that are not included in the primitive words are each deconstructed into primitive words, as depicted in 620. If the collected words are "the", "these", "boys", "planted", and "trees", a model generation apparatus, such as model generation apparatus 100 of FIG. 1 or 2, may deconstruct "boys" into "boy" and "s", "planted" into "plant" and "ed", and "trees" into "tree" and "s".

In 630, the pronunciation dictionary that includes only primitive words is generated based on the word deconstruction results. Such a model generation apparatus may generate the pronunciation dictionary by adding the words "the", "boy", "s", "plant", "ed", "these", and "tree".

Figure 7:
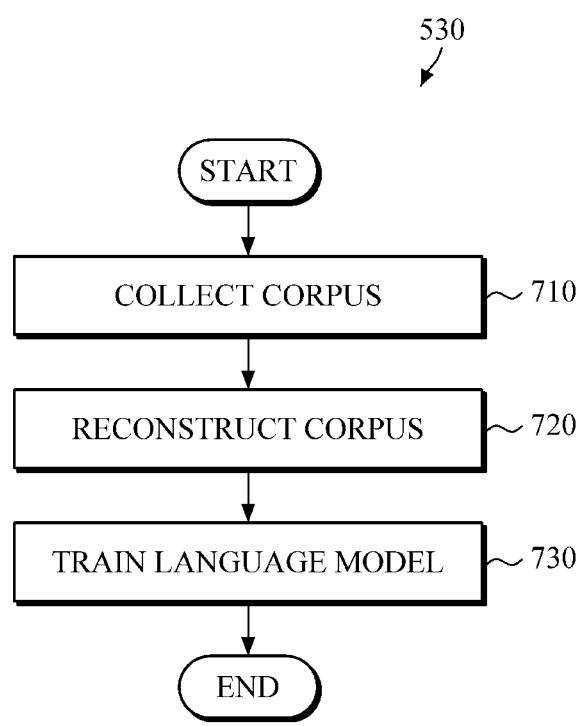
FIG. 7 is a flowchart illustrating an example of a process of generating a language model according to an embodiment.

FIG. 7 is a flowchart illustrating an example of a process of generating a language model, such as the process 530 of generating the language model of FIG. 5, noting that embodiments are not limited to the same.

Referring to FIG. 7, in the process of generating the language model, a corpus for training a language model is collected first, as depicted in 710.

Then, the corpus is reconstructed by deconstructing words in the corpus into primitive words, as depicted in 720. The words that are determined not to be primitive words in the corpus are each deconstructed into primitive words and the corpus is reconstructed in which the primitive words are spaced apart from each other. For example, a corpus includes the sentence "The boys planted these trees", the model generation apparatus 100 may deconstruct the non-primitive words "boys", "planted", and "trees" into "boy" and "s", "plant" and "ed", and "tree" and "s", respectively, and reconstruct the corpus that contains the sentence "The boy s plant ed these tree s".

In 730, the language model is trained based on the reconstructed corpus so that the language model includes only primitive words. The model generation apparatus 100, according to one or more embodiments, may generate the language model that includes only primitive words by using one or more of a recurrent neural network (RNN), long short term memory (LSTM), a decision tree, a genetic algorithm (GA), genetic programming (GP), Gaussian process regres-
sion, linear discriminant analysis, K-nearest neighbor (K-NN), the percept theory, a radial basis function network, and a support vector machine.

Figure 8:
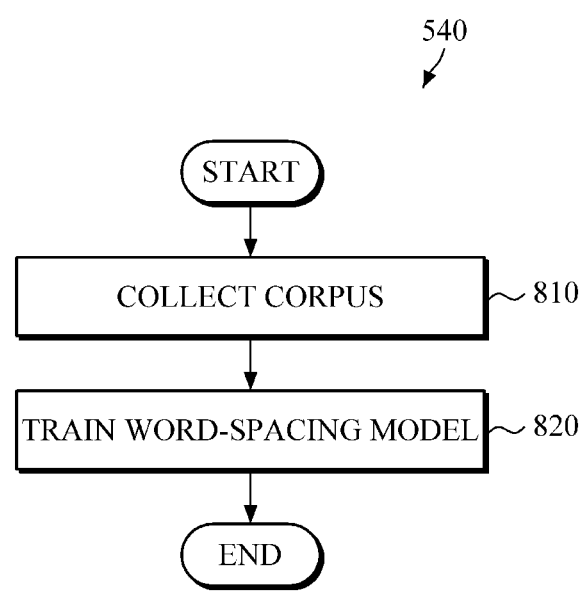
FIG. 8 is a flowchart illustrating an example of the process of generating a word-spacing model according to an embodiment.

FIG. 8 is a flowchart illustrating an example of a process of generating a word-spacing model, such as the process of generating a word-spacing model of FIG. 5, noting that embodiments are limited thereto.

Referring to FIG. 8, which, for convenience, is described in reference to the example of the process 540 of generating the word-spacing model of FIG. 5, and a corpus for training the word-spacing model is collected first, as depicted in 810.

The word-spacing model is trained using the collected corpus, as depicted in 820. A model generation apparatus, such as the example model generation apparatus 100 seen in FIG. 1 or 2, noting that embodiments are limited thereto, may train the word-spacing model by defining, as input data, each syllable of a respective sentence in the collected corpus and defining, as target data, the information about whether the syllable is spaced apart from the following syllable. The word-spacing model may also be trained on punctuation marks, as well as word spacing.

The model generation apparatus may generate the word-spacing model using one or more of a recurrent neural network (RNN), long short term memory (LSTM), a decision tree, a genetic algorithm (GA), genetic programming (GP), Gaussian process regression, linear discriminant analysis, K-nearest neighbor (K-NN), the percept theory, a radial basis function network, and a support vector machine.

Figure 9:
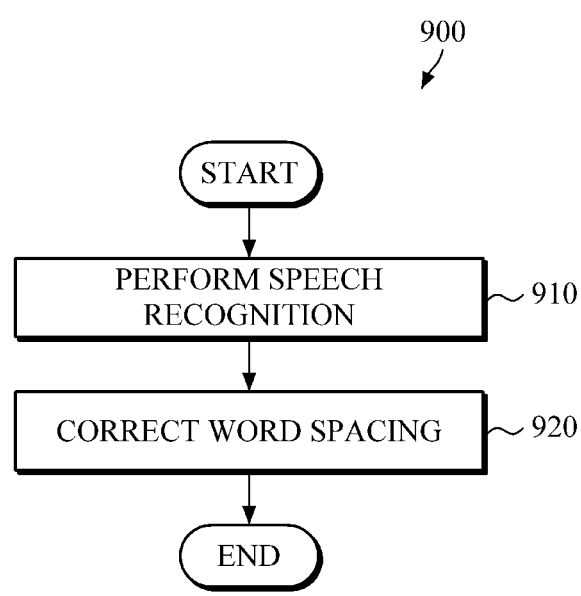
FIG. 9 is a flowchart illustrating an example of a speech recognition method, according to an embodiment.

FIG. 9 is a flowchart illustrating an example of a speech recognition method.

Referring to FIG. 9, the speech recognition method 900 may begin with performing speech recognition using an acoustic model, a pronunciation model including only primitive words, and a language model including only primitive words, as depicted in 910.

Then, in 920, word-spacing in the speech recognition result is corrected using a word-spacing model.

Figure 10:
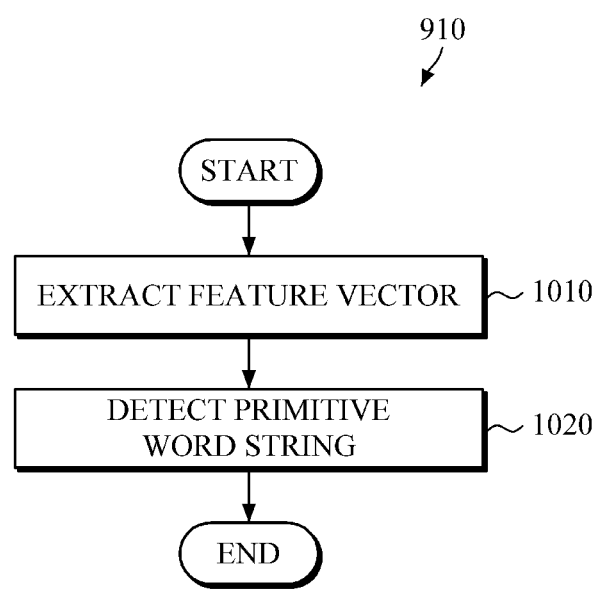
FIG. 10 is a flowchart illustrating an example of a speech recognition process, according to an embodiment.

FIG. 10 is a flowchart illustrating an example of a speech recognition process, such as the example seen in FIG. 9, noting that embodiments are limited thereto.

Referring to FIG. 10, the speech recognition process may begin with extracting a feature vector from a speech signal, as depicted in 1010. For example, the speech recognition apparatus 200 divides the input speech signal into language unit frames of equal length, and extracts a feature vector from a corresponding unit frame, according to one or more embodiments.

Then, in 1020, a word sequence determined to have the highest probability is detected from the feature vector based on the acoustic model, the pronunciation dictionary including solely primitive words, and the language model including only the primitive words.

The above methods and operations may be implemented, according to one or more embodiments, in a mobile terminal and/or wearable device. Such a mobile terminal or wearable device has user input and output hardware, such as a microphone, display/touch screen, physical buttons, speaker, vibration motor, camera, intercoupled via a bus to one or more processors and a memory. The disclosed speech recognition features may be especially useful in wearable devices which generally do not have physical keyboards and only limited display area for user text/command entry. Upon recognizing a user's speech, the mobile terminal may effectuate commands (such as "text Frank", "what is the weather?", "capture image," "start recording", and the like) responsive to the detected speech and/or may transcribe the recognized text to facilitate communications such as text messages, emails, various instant messengers, and the like.

As a non-exhaustive example only, a terminal or mobile terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Figure 11:
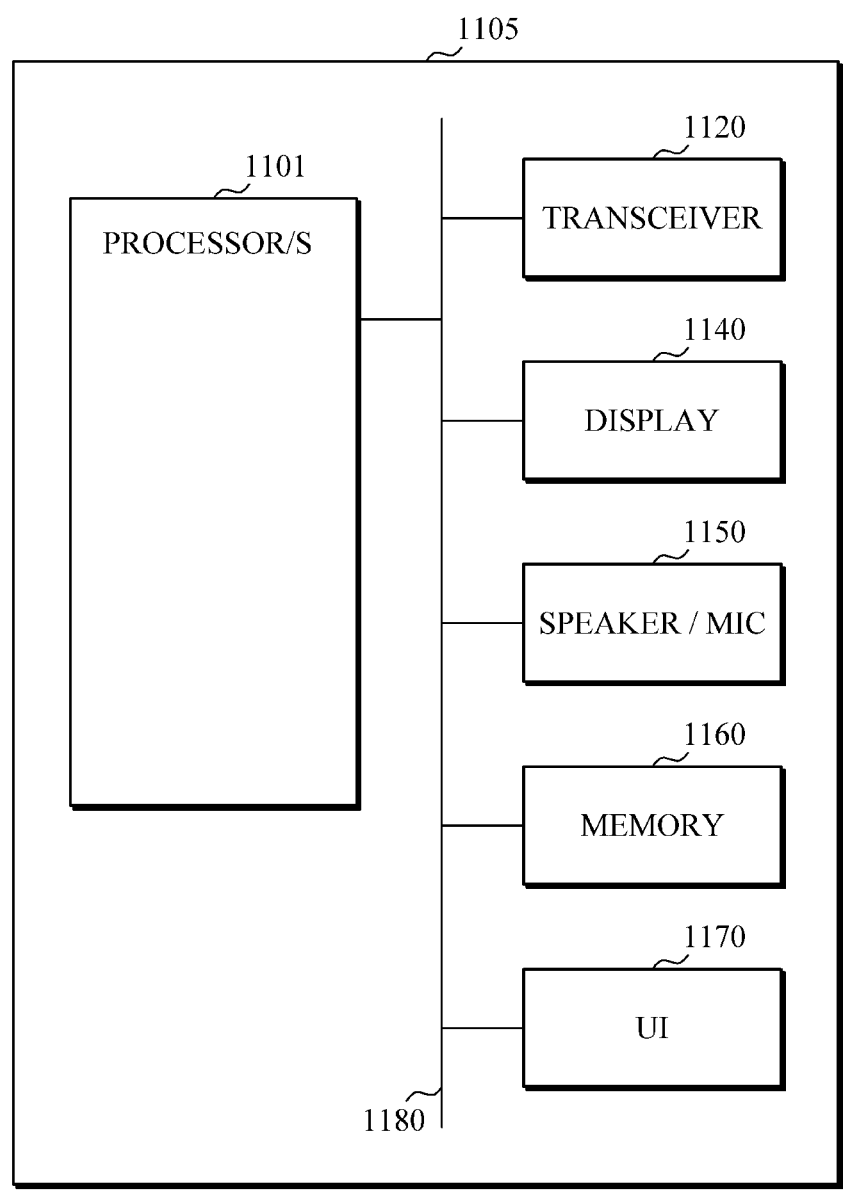
FIG. 11 is a diagram illustrating an example of a speech recognition apparatus according to an embodiment.

FIG. 11 illustrates an example of such a mobile terminal 1105 according to one or more embodiments. The mobile terminal 1105 may be a speech recognition apparatus, such as of FIG. 1 or 2, that may further include a model generation apparatus, such as seen in FIG. 1 or 3, or such a model generation apparatus that also may include such a speech recognition apparatus. The mobile terminal 1105 includes one or more processors 1101 to implement any of the above model generation apparatus 100 or speech recognition apparatus 200 or operations described in FIGS. 1-10, and intercoupled via a bus 1180 with one or more transceiver devices for wired or wireless communication 1120; a display device 1140 configured to display recognized words to a user and provide for user interaction, such as manual correction of errors, and the like; one or more microphones and/or speakers 1150 configured to receive a user's speech for recognition and interact with the user; memory 1160; a user interface (UI) 1170 which may include a camera, keyboard, touchscreen, touchpad, gaze detection, monitor, and/or other input detection. The mobile terminal may take the resulting text from speech recognition and populate the text into a communication application, or may interpret the result as a command.

An image display in the mobile terminal described herein may be implemented using a liquid crystal display (LCD), a light-emitting diode (LED) display, a plasma display panel (PDP), a screen, a terminal, or any other type of display configured to display the images and information to be displayed by the image display apparatus. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

The speech recognition apparatus 200, model generation apparatus 100, word-spacing model generator 140, language model generator 130, pronunciation dictionary generator 120, acoustic model generator 110, word-spacing corrector 220, feature extractor 211, decoder 212, acoustic model storage 230, pronunciation dictionary storage 240, language model storage 250, and word-spacing model storage 260 in FIGS. 1-3 and 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus comprising:
   a processor configured:
      to recognize a user's speech using any one or any combination of any two or more of a pronunciation dictionary comprising primitive words, and a language model comprising primitive words, the primitive words being formed of deconstructed compound words; and
      to correct word spacing in a result of speech recognition based on a word-spacing model, wherein spaces interposed between primitive words of deconstructed compound words are adaptively removed from the result of speech recognition to reconstitute the compound words.

2. The speech recognition apparatus of claim 1, wherein either one or both of the pronunciation dictionary and the language model are configured to comprise the primitive words according to any one or any combination of any two or more of the following criteria: words whose frequency of use is determined to be greater than a specific threshold; morpheme-level words; and syllable-level words.

3. The speech recognition apparatus of claim 1, wherein the language model comprising the primitive words is trained using a corpus reconstructed to comprise the primitive words.

4. The speech recognition apparatus of claim 3, wherein the corpus is reconstructed to consist essentially of the primitive words.

5. The speech recognition apparatus of claim 4, wherein the corpus is reconstructed to consist solely of the primitive words.

6. The speech recognition apparatus of claim 1, wherein the word-spacing model is trained using a corpus.

7. The speech recognition apparatus of claim 1, further comprising a memory configured to store instructions;
   wherein the processor is further configured to execute the instructions to configure the processor to recognize the user's speech using an acoustic model and any one or any combination of any two or more of the pronunciation dictionary comprising primitive words, and the language model comprising the primitive words, and to correct word spacing in the result of speech recognition based on the word spacing model.

8. The speech recognition apparatus of claim 1, wherein the processor comprises:
- a speech recognizer configured to recognize the user's speech using an acoustic model and any one or any combination of any two or more of the pronunciation dictionary comprising primitive words, and the language model comprising primitive words; and,
- a word-spacing corrector configured to correct word spacing in the result of speech recognition based on the word-spacing model.

9. The speech recognition apparatus of claim 8, wherein the speech recognizer comprises a feature extractor configured to extract a feature vector from an input speech signal, and a decoder configured to detect a primitive word string of a substantially highest probability from the extracted feature vector based on the acoustic model and any one or any combination of any two or more of the pronunciation model, and the language model.

10. The speech recognition apparatus of claim 9, wherein the decoder is further configured to detect the primitive word string of the highest probability from the extracted feature vector based on the acoustic model, the pronunciation model, and the language model.

11. The speech recognition apparatus of claim 1, wherein the processor is further configured to recognize the user's speech using an acoustic model, the pronunciation dictionary, and the language model.

12. The speech recognition apparatus of claim 1, wherein the pronunciation dictionary and the language model consist essentially of primitive words.

13. The speech recognition apparatus of claim 12, wherein the pronunciation dictionary and the language model consist solely of primitive words.

14. A speech recognition method comprising:
- performing speech recognition using any one or any combination of any two or more of a pronunciation dictionary comprising primitive words, and a language model comprising the primitive words, the primitive words being formed of deconstructed compound words; and
- correcting word spacing in a result of speech recognition using a word-spacing model, wherein spaces interposed between primitive words of deconstructed compound words are adaptively removed from the result of speech recognition to reconstitute the compound words.

15. The speech recognition method of claim 14, wherein either one or both of the pronunciation dictionary and the language model are generated to comprise the primitive words based on any one or any combination of any two or more of the following criteria: words whose frequency of use is determined to be greater that a specific threshold; morpheme-level words; and syllable-level words.

16. The speech recognition method of claim 14, wherein the performing of the speech recognition comprises extracting a feature vector from an input speech signal, and detecting a primitive word string of a substantially highest probability from any one or any combination of any two or more of the extracted feature vector based on an acoustic model, the pronunciation model, and the language model.

17. The speech recognition method of claim 14, wherein the language model is generated to consist of only the primitive words, trained using a corpus reconstructed to consist of the primitive words.

18. The speech recognition method of claim 14, wherein the word-spacing model is trained using a corpus.

19. The speech recognition method of claim 14, wherein the performing of the speech recognition uses an acoustic model, the pronunciation dictionary, and the language model.

20. The speech recognition method of claim 14, wherein the pronunciation dictionary and language model are generated to consist essentially of the primitive words.

21. The speech recognition method of claim 14, wherein the pronunciation dictionary and language model are generated to consist solely of only the primitive words.

22. A speech recognition apparatus, comprising:
- a processor configured to:
  - generate a pronunciation dictionary that comprises primitive words;
  - generate a language model that is trained using a corpus which is reconstructed to comprise primitive words; and
  - generate a word-spacing model that is trained using a collected corpus, wherein the primitive words are formed of deconstructed compound words and the word-spacing model being configured to correct word spacing in a result of speech recognition based on the word-spacing model, and spaces interposed between primitive words of deconstructed compound words are adaptively removed from the result of speech recognition to reconstitute the compound words.

23. The speech recognition apparatus of claim 22, further comprising a memory configured to store instructions;
- wherein the processor is further configured to:
  - execute the instructions to configure the processor to generate a pronunciation dictionary that comprises primitive words;
  - generate a language model that is trained using a corpus which is reconstructed to comprise primitive words; and
  - generate a word-spacing model that is trained using a collected corpus.

24. The speech recognition apparatus of claim 22, wherein the processor comprises:
- a pronunciation dictionary generator configured to generate a pronunciation dictionary that comprises primitive words;
- a language model generator configured to generate a language model that is trained using a corpus which is reconstructed to comprise primitive words; and
- a word-spacing model generator configured to generate a word-spacing model that is trained using a collected corpus.

25. The speech recognition apparatus of claim 24, wherein the pronunciation dictionary generator comprises:
- a word collector configured to collect words;
- a word deconstructor configured to deconstruct words that are not primitive words among the collected words into primitive words; and
- a dictionary generator configured to build the pronunciation dictionary that consists essentially of only the primitive words based on a result of word deconstruction.

26. The speech recognition apparatus of claim 24, wherein the language model generator comprises:
- a corpus collector configured to collect the corpus;
- a corpus reconstructor configured to reconstruct the corpus by deconstructing words in the corpus into primitive words; and a language model trainer configured to generate the language model that is trained on the reconstructed corpus and consists essentially of the primitive words.

27. The speech recognition apparatus of claim 26, wherein the corpus reconstructor reconstructs the corpus to space the primitive words apart from each other.

28. The speech recognition apparatus of claim 24, wherein the word-spacing model generator comprises a corpus collector configured to collect a corpus and a word-spacing model trainer configured to train the word-spacing model by defining each syllable of a respective sentence in the collected corpus as input data and defining information about whether the syllable is spaced apart from a following syllable as target data.

29. The speech recognition apparatus of claim 28, wherein the word-spacing model trainer uses any one or any combination of any two or more of a recurrent neural network (RNN), long short term memory (LSTM), a decision tree, a genetic algorithm (GA), genetic programming (GP), Gaussian process regression, linear discriminant analysis, K-nearest neighbor (K-NN), the percept theory, a radial basis function network, and a support vector machine.

30. A non-transitory computer-readable storage medium storing instructions that, when executed by a processor, cause the processor to perform the method of claim 14.

31. A speech recognition method, comprising:
generating a pronunciation dictionary formed of primitive word portions selectively identified according to a predetermined criteria;
recognizing speech of a user based on an acoustic model trained to correspond with the pronunciation dictionary formed of the primitive word portions
transforming a natural language corpus into a primitive word corpus formed of primitive word portions; and,
generating a language model based on the transformed corpus to define interrelations amongst the primitive word portions.

32. The method of claim 31, wherein the recognizing the speech is further based on probabilities according to the language model based on the transformed primitive word corpus.

33. The method of claim 31, further comprising:
generating a word-spacing model according to a corpus; and,
correcting word spacing in a result of the speech recognizing using the word-spacing model.

34. The method of claim 31, further comprising transmitting a message including the corrected result of the speech recognizing.

35. The method of claim 31, further comprising executing a command in response to a result of the speech recognizing.

36. A non-transitory computer-readable storage medium storing instructions that, when executed by a processor, cause the processor to perform the method of claim 31.

* * * * *